Aug. 26, 1924.
C. S. HOLLANDER
1,506,301
PROCESS OF MAKING SULPHUR DIOXIDE
Filed Oct. 16, 1922
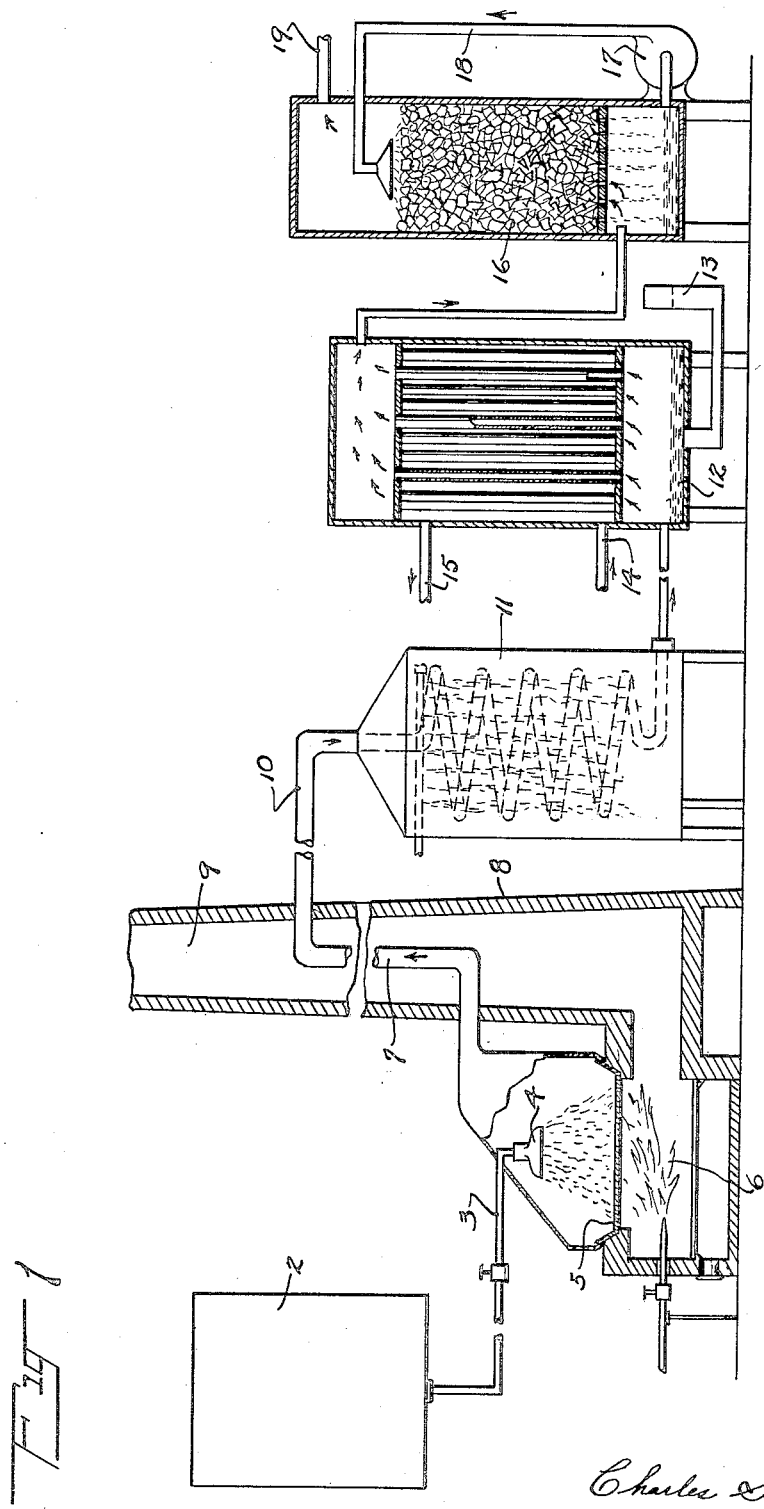
INVENTOR
Charles S. Hollander.
BY Alan Wilmann
ATTORNEY Patented Aug. 26, 1924.

1,506,301

UNITED STATES PATENT OFFICE.

CHARLES S. HOLLANDER, OF PHILADELPHIA, PENNSYLVANIA, ASSIGNOR TO ROHM & HAAS COMPANY, A CORPORATION OF DELAWARE.

PROCESS OF MAKING SULPHUR DIOXIDE.

Application filed October 16, 1922. Serial No. 594,750.

*To all whom it may concern:*

Be it known that I, CHARLES S. HOLLANDER, a citizen of the United States, and a resident of Philadelphia, county of Philadelphia, and State of Pennsylvania, have invented a certain new and useful Process of Making Sulphur Dioxide, of which the following is a specification.

My invention relates to a method of making substantially pure sulphur dioxide and is based upon the discovery that if sulphur and sulphuric acid are both converted into the vapor phase, and the vapors are allowed to mix in the proper proportions and under proper conditions, sulphur dioxide substantially pure except for the presence of a small amount of water vapor can readily be produced in accordance with the reaction $2H_2SO_4 + S = 3SO_2 + 2H_2O$.

Sulphur dioxide is now being manufactured in large quantities and very cheaply by burning sulphur or by roasting sulphur ores. However, the resulting gases usually contain no more than about 12% of sulphur dioxide. Since the roasting or combustion is carried out in the preesnce of air, the resulting sulphur dioxide is necessarily diluted and the process of purifying the sulphur dioxide is expensive and demands a great deal of equipment. By my process sulphur dioxide of over 99% purity can be obtained more cheaply and quickly and with a very much smaller plant than would otherwise be necessary.

My preferred way of blending sulphur and sulphuric acid in the vapor phase, is to suspend powdered sulphur in sulphuric acid in such proportion that there is an excess of sulphuric acid present over that required for the reaction, as for example, 15 parts by weight of ground sulphur to 100 parts by weight of 66° Bé. sulphuric acid, and then to heat portions of the mixture so that both ingredients are volatilized simultaneously and almost instantaneously. It is desirable to have a small excess of sulphuric acid present at all times both because the sulphuric acid present serves to prevent the sulphur from reacting with iron present in the apparatus used, and because an excess of sulphur might cause a stoppage in the apparatus at some point where the vapors were allowed to cool. The gases resulting from the volatilization of the raw materials, which at first contain $SO_3$, water vapor and vaporized sulphur, are allowed to react at a temperature above the boiling point of sulphur and preferably, though not essentially, in an iron pipe, for iron seems to have some catalytic effect to speed the reaction. After the reaction has been completed the vapors are cooled, precipitated water is removed, and the residue is then passed through a scrubbing tower containing sulphuric acid which removes the balance of the water vapor and any excess $SO_3$ that may be present.

In order that a manner of carrying out my invention may be readily understood by those skilled in the art, I show in the accompanying drawing a diagrammatic representation of a form of equipment which may be used. In this drawing 2 represents a tank in which the sulphuric acid and powdered sulphur are mixed, preferably so that 15 parts of powdered sulphur are suspended in each 100 parts of 66° Bé. sulphuric acid. From the tank 2 the mixed ingredients flow through the pipe 3 which ends in some appropriate device such as the head 4 for depositing the mixture in small particles on the iron plate 5. The iron plate 5 is heated by a furnace 6 to a temperature of about 500° C. so that as the particles of the mixed ingredients fall slowly on the plate 5 they are immediately volatilized. The vapors pass up through iron pipe 7 which passes through the stack 8 of the furnace 6. In the stack 8 the pipe 7 is kept at a temperature above the boiling point of the sulphur so that the reaction continues as has been described. The products of combustion are led off by the flue 9 and the reaction products pass through the pipe 10 to the iron condenser 11. The iron condenser 11 is cooled by a water spray so that the vapors are reduced to a temperature a little below the melting point of lead. From the condenser 11 the vapors are brought into the lead pipe condenser 12 which is provided with a water trap 13. The condenser 12 is cooled by a flow of water which enters the condenser through the pipe 14 and flows out through the pipe 15. From the condenser 12 the vapors are led into a scrubber 16 through which sulphuric acid flows in a direction counter to the flow of the gases. The sulphuric acid is circulated in the scrubber 16 by the centrifugal pump 17 and a pipe 18. From the top of the scrubber 16 the substantially pure $SO_2$ gas is withdrawn as through the pipe 19. The gas so obtained tests above 99% in purity and can be used wherever pure sulphur dioxide gas is required. If desired the sulphuric acid used in the scrubber may, after it has been mixed with the appropriate quantity of powdered sulphur, be used for generating additional quantities of the $SO_2$ gas.

It is to be distinctly understood that the foregoing detailed description of one manner of carrying out my process is given for illustrative purposes only and that the same can readily be modified in many ways without departing from the spirit of my invention.

What I claim is:

1. The method of producing sulphur dioxide which comprises the steps of spraying a suspension of sulphur and sulphuric acid on a hot plate and permitting their vapors to react.

2. The method of producing sulphur dioxide which comprises the step of permitting sulphur and an excess of sulphuric acid over the theoretical amount needed for the reaction $2H_2SO_4 + S = 3SO_2 + 2H_2O$ to react in the presence of a catalyst while both are in the vapor phase.

3. The method of producing sulphur dioxide which comprises the steps of simultaneously and rapidly volatilizing sulphur suspended in sulphuric acid, permitting the vapors of said materials to react, cooling, removing condensed water and scrubbing with sulphuric acid.

4. The method of producing sulphur dioxide which comprises the steps of volatilizing sulphur in the presence of an excess of sulphuric acid over the theoretical amount needed for the reaction $2H_2SO_4 + S = 3SO_2 + 2H_2O$, under conditions which will cause the sulphur to be volatilized simultaneously with the sulphuric acid, and maintaining the vapors at a temperature above the boiling point of sulphur until said reaction shall take place.

CHARLES S. HOLLANDER.